United States Patent [19]
Morin

[11] 3,939,736
[45] Feb. 24, 1976

[54] PLANET CARRIER FOR A PLANETARY GEAR TRAIN

[75] Inventor: Jean Morin, Rueil-Malmaison, France

[73] Assignee: Regie Nationale des Usines Renault, France

[22] Filed: Sept. 12, 1974

[21] Appl. No.: 505,373

[30] Foreign Application Priority Data
Oct. 10, 1973   France .............................. 73.36224

[52] U.S. Cl. ................................................. 74/801
[51] Int. Cl.² ........................................... F16H 1/28
[58] Field of Search ................... 74/797, 801, 750 R

[56] References Cited
UNITED STATES PATENTS 3,527,121   9/1970   Moore .............................. 74/801 X
3,780,601   12/1973   Dach et al. ........................ 74/801 X

*Primary Examiner*—Leonard H. Gerin
*Attorney, Agent, or Firm*—Bucknam and Archer

[57] ABSTRACT

The planet carrier has a middle radial flange connected on either side to two lateral radial flanges by two respective sets of ribs of equal number. The ribs are spaced around the planet carrier and extend longitudinally and radially. Each pair of adjacent ribs of each set delimits a recess in conjunction with the middle flange and the corresponding lateral flange. The recesses on either side of the middle flange communicate with each other through respective apertures in the middle flange. One set of recesses is to accommodate short planet wheels, while the apertures allow long planet wheels—meshing with the short planet wheels — to be mounted between the lateral flanges.

7 Claims, 3 Drawing Figures

PLANET CARRIER FOR A PLANETARY GEAR TRAIN

The present invention relates to a planet carrier for a planetary gear train, e.g. for use in the gear box of an automobile vehicle.

The invention relates especially to a planet carrier which can be manufactured at low cost by casting or by sintering metal powders and which may be made most advantageously in one piece.

The invention is particularly concerned with the type of planet carrier which comprises a middle flange between two lateral flanges, and linking members connected to the middle flange and the other two flanges.

In accordance with the present invention, in order that the planet carrier can be manufactured in a single piece, the linking members between the middle flange and the lateral flanges are two sets of longitudinal ribs which extend in a radial direction, adjacent pairs of ribs of the same set together with the corresponding flange and the middle flange delimiting a recess, the various recesses being arranged in such a way that the first recess which is delimited by two adjacent ribs of the first set open via a cut-out portion of the middle flange into a second recess delimited by the ribs of the second set.

Further features and advantages of the invention will be better understood from the following description of an embodiment of planet carrier, given by way of example only, with reference to the accompanying drawings, in which.

Figure 1:
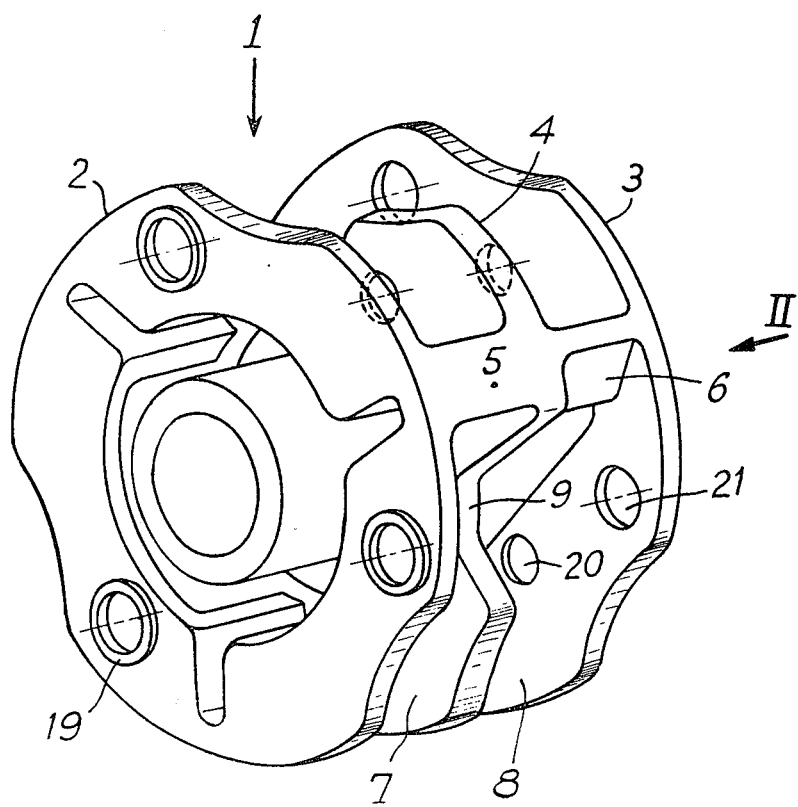
FIG. 1 is a perspective view of a planet carrier.
Figure 2:
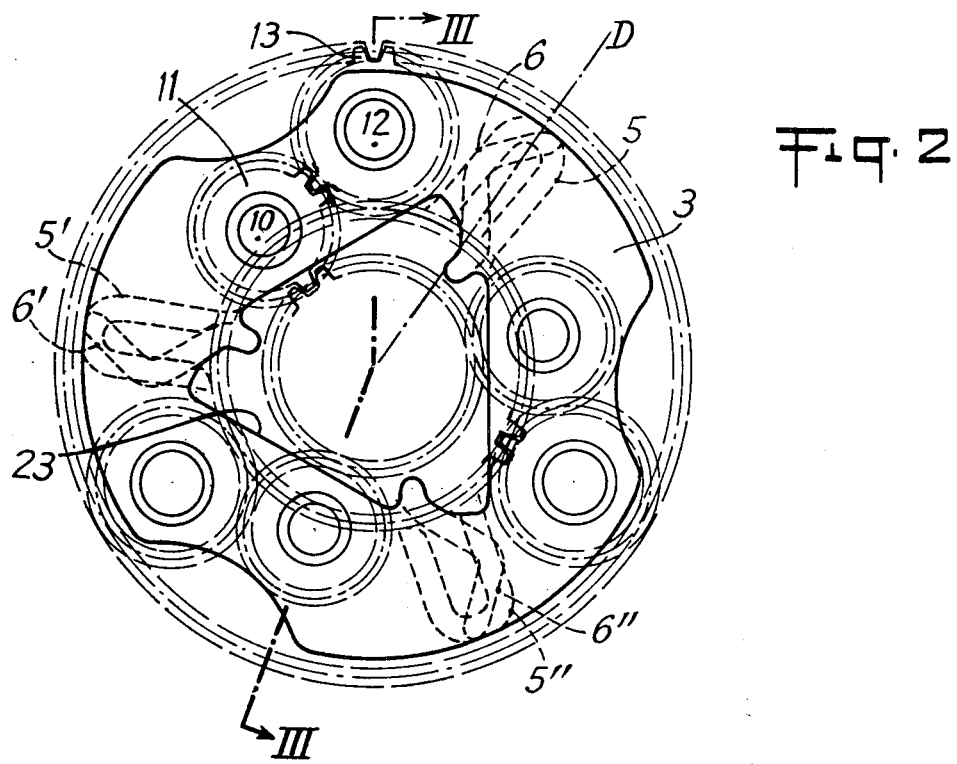
FIG. 2 is an end view of the planet carrier in the direction of the arrow II of FIG. 1, showing the disposition of the various planet wheels.

The planet carrier 1 shown in FIGS. 1 and 2 has two lateral radial flanges 2, 3 which are connected to a middle radial flange 4 by linking members which comprise two sets of longitudinal ribs 5, 5', 5" and 6, 6', 6", the sets being in register with one another. The three ribs 5, 5', 5" of the first set link the flange 2 to the middle flange 4 while the three ribs 6, 6', 6" of the second set link the flange 3 to the middle flange 4. The ribs 5, 6, for example, as well as extending longitudinally of the planet carrier, extend in a direction D which is substantially radial.

Each adjacent pair of ribs, e.g. 5, 5', of the first set together with the corresponding flange 2 and the middle flange 4 delimit a recess 7. Each adjacent pair of ribs, e.g. 6, 6', of the second set together with the corresponding flange 3 and the middle flange 4 likewise delimit a recess 8.

The recesses 7, 8 are arranged around the periphery of the planet carrier in such a way that each recess 7 opens, via an aperture or cut-out portion 9 in the middle flange 4, into one corresponding recess 8.

The recesses 7 and 8 widen outwards towards the periphery of the planet carrier so that the planet carrier can be manufactured by casting.

Figure 3:
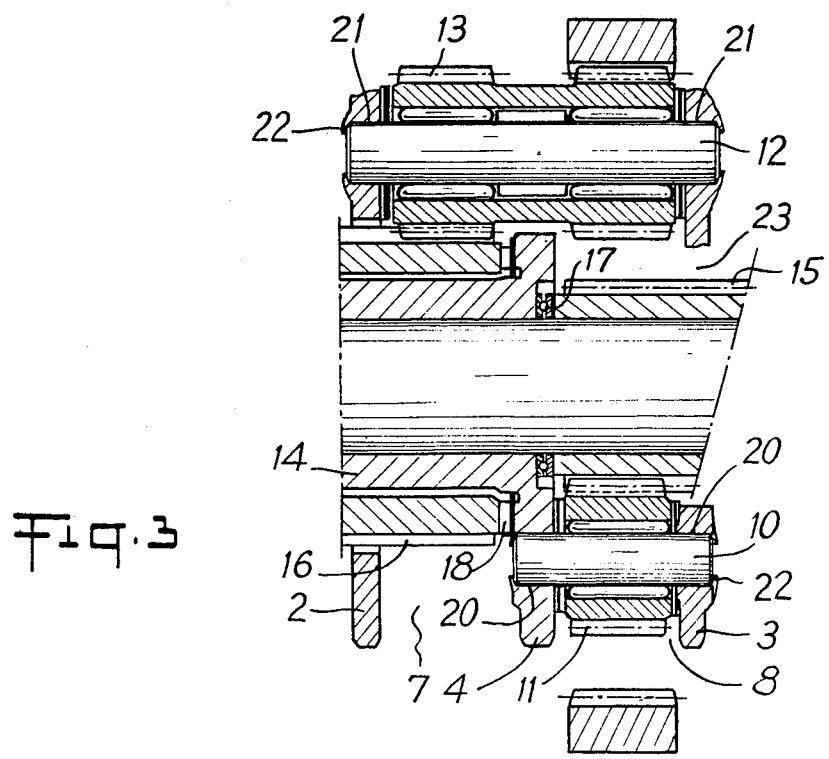
FIG. 3 is a sectional view of the planetary gear train, taken on line III—III of FIG. 2.

In the planetary gear train shown in FIGS. 2 and 3, the planet carrier has spindles 10 mounted in bores 20 in the flanges 3 and 4. The spindles 10 support short planet wheels 11 which are arranged in the recesses 8 delimited by the rib 6, 6', 6".

The planet carrier also has spindles 12 mounted in bores 21 in the lateral flanges 2, 3. The spindles 12 support long planet wheels 13 each occupying two corresponding recesses 7 and 8 and extending through the cut-out portion 9 of the middle flange 4.

According to a known feature of the planetary gear train, the short planet wheels 11 mesh with the respective long planet wheels 13. The lateral flanges 2, 3 and the middle flange 4 have bosses 19 into which the bores 20, 21 of the supporting spindles 10, 12 emerge; the bosses 19 have local deformations 22 which act as axial stops for the spindles 10, 12.

As shown in FIG. 3, the middle flange 4 is integral with a shaft 14 serving as the output shaft of the planetary gear train. The gear train further comprises an input sun-gear 15, which meshes with the short planet wheels 11, and also a reaction sun-gear 16 which meshes with the long planet wheels 13. Positioned between the input sun-gear 15 and the middle flange 4 there is a needle thrust bearing 17; there is also needle thrust bearing 18 between the reaction sun-gear 16 and the middle flange 4.

As shown in FIG. 2, the planet carrier 1 has a front aperture 23 for the passage of the input sun-gear 15; the arrangement of the sets of ribs with respect to the aperture 23, facilitates machining of the interior faces of the flanges 3 and the middle flange 4.

I claim:

1. In a planet carrier comprising two lateral radial flanges and a middle radial flange, the improvement comprising two sets of ribs of equal number connecting the respective lateral flanges and the middle flange, the ribs being spaced around the planet carrier and extending longitudinally and radially inward from the periphery of the planet carrier, each pair of adjacent ribs of each set together with the corresponding lateral flange and the middle flange delimiting a recess, each recess between one lateral flange and the middle flange opening through an aperture in the middle flange into a corresponding one of the recesses between the middle flange and the other lateral flange.

2. A planet carrier as claimed in claim 1, further comprising short spindles mounted on one of the lateral flanges and the middle flange, short planet wheels which are carried by the respective short spindles and which are arranged in the respective recesses between said one lateral flange and the middle flange, long spindles mounted on the two lateral flanges, and long planet wheels which are carried by the respective long spindles and which mesh with the respective short planet wheels, the long planet wheels extending through the respective apertures in the middle flange into the corresponding recesses on either side of the middle flange.

3. A planet carrier as claimed in claim 2, in which the lateral flanges and the middle flange have bosses into which the said bores extend and which receive the ends of the spindles carrying the planet wheels, the bosses having local deformations which serve as axial stops for the spindles.

4. A planet carrier as claimed in claim 1, in which each said recess widens outwards towards the periphery of the planet carrier.

5. A planet carrier as claimed in claim 1, further comprising an axial shaft connected to the middle flange.

6. A planet carrier as claimed in claim 1, in which the middle flange, the lateral flanges, and the two sets of ribs are integral with one another.

7. A planet carrier as claimed in claim 6, in which the flanges and ribs are of cast metal and are each part of one and the same casting.

* * * * *